United States Patent [19]

Tagg

[11] Patent Number: 5,560,050
[45] Date of Patent: Oct. 1, 1996

[54] PORTABLE COMBINED TOILET AND WASTE HOLDING TANK

[75] Inventor: Richard L. Tagg, Sandhutton, England

[73] Assignee: PolyJohn Enterprises Corporation, Whiting, Ind.

[21] Appl. No.: 380,683

[22] Filed: Jan. 30, 1995

[51] Int. Cl.⁶ .................................................. A47K 11/02
[52] U.S. Cl. ................................................................ 4/449
[58] Field of Search .............................. 4/317, 318, 321, 4/322, 323, 449, 450, 459, 460, 462, 463, 476–479, 483

[56] References Cited

U.S. PATENT DOCUMENTS

| | | | |
|---|---|---|---|
| 432,461 | 7/1890 | Warton et al. | 4/463 X |
| 3,074,076 | 1/1963 | Kersten | 4/459 |
| 4,305,164 | 12/1981 | Sargent et al. | 4/460 X |
| 5,251,342 | 10/1993 | Sansom et al. | 4/449 X |

FOREIGN PATENT DOCUMENTS 2236712  2/1973  Germany .................. 4/460

*Primary Examiner*—Charles E. Phillips
*Attorney, Agent, or Firm*—Harness, Dickey & Pierce, P.L.C.

[57] ABSTRACT

A combined toilet and waste holding tank is provided for mounting within a portable toilet cabana having side walls, a rear wall, and a front wall with a door and a floor. The tank extends along the rear wall and between the side walls and occupies roughly the rear half of the cabana floor space. The toilet includes a ring-like structure having a rear portion opening directly into the tank through a cover panel upon the upper surface of the tank, and also having a forward extending, bowl-like portion which is integral with and extends forwardly of the front wall of the tank. The cabana has a rear-to-front extending central axis which approximately bisects the cabana. The toilet structure is located substantially on one side of the cabana axis, so that it is closer to one side wall of the cabana and the toilet is acutely angled relative to the cabana axis. The front wall of the tank is angled relative to the cabana axis so that it is perpendicular to the axis of the toilet on opposite sides of the toilet bowl-like portion. The arrangement provides increased occupant usable floor space within the cabana, enables nesting a pair of tanks for storage and shipment independently of the cabana, and functions as both a urinal and toilet.

11 Claims, 7 Drawing Sheets

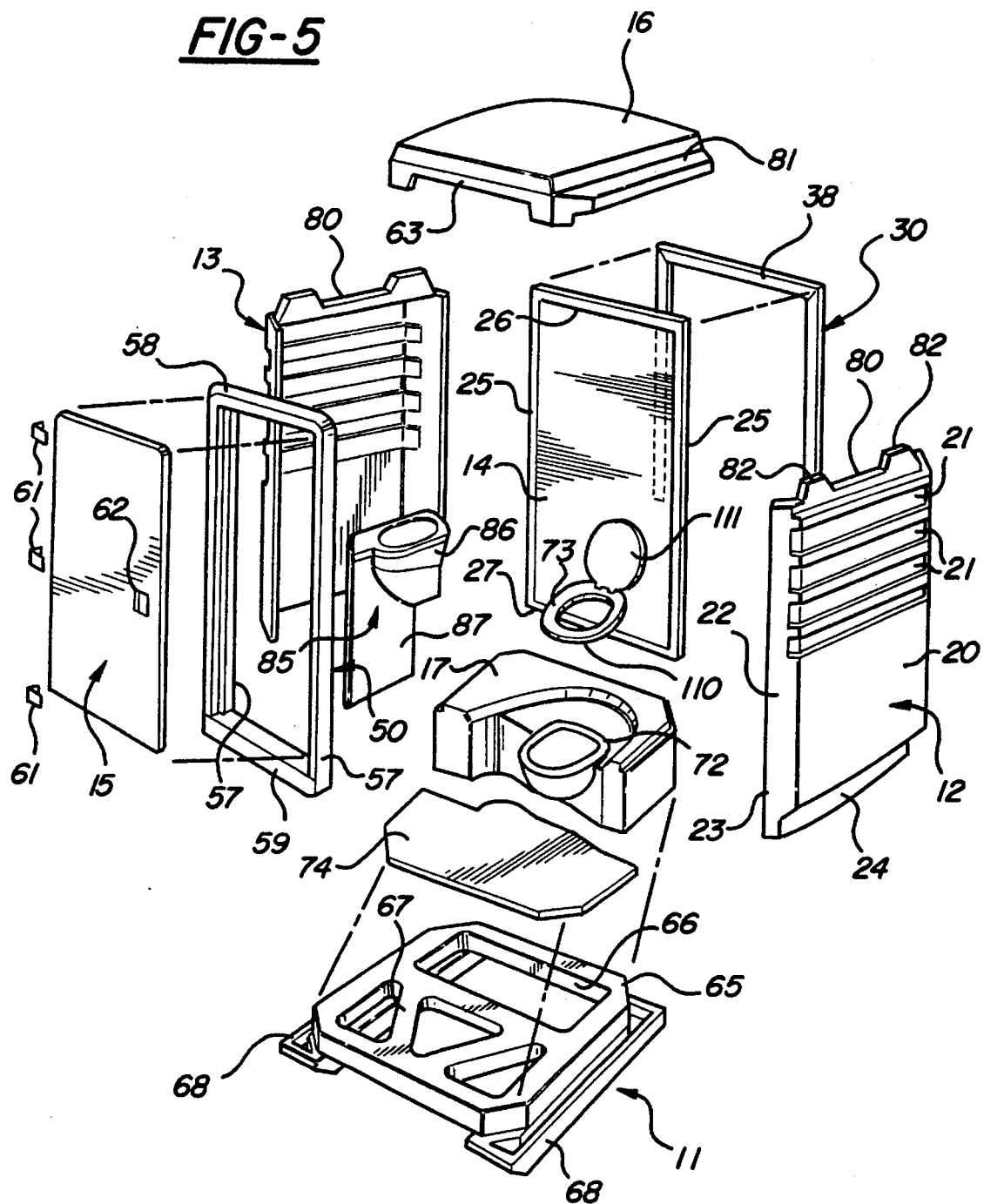

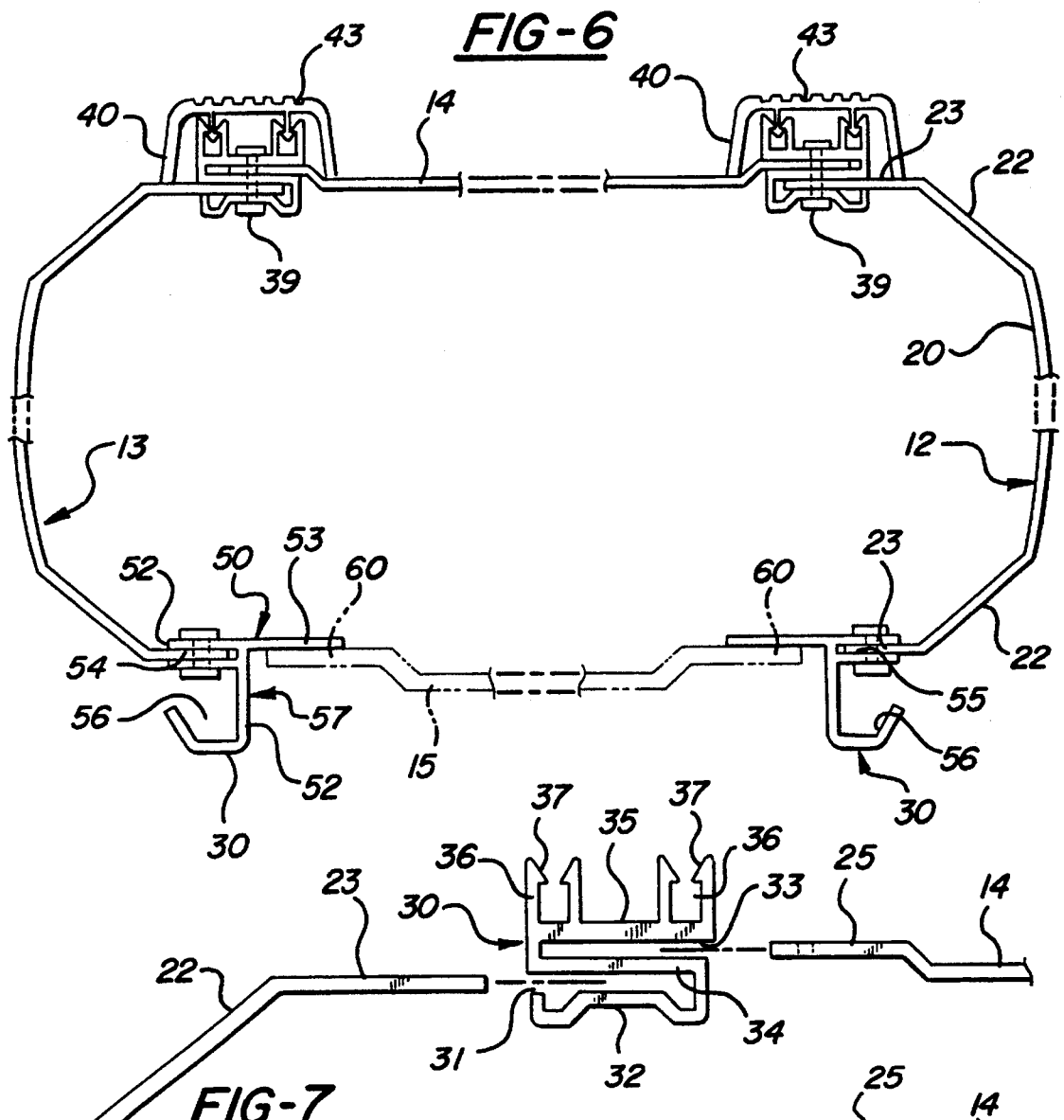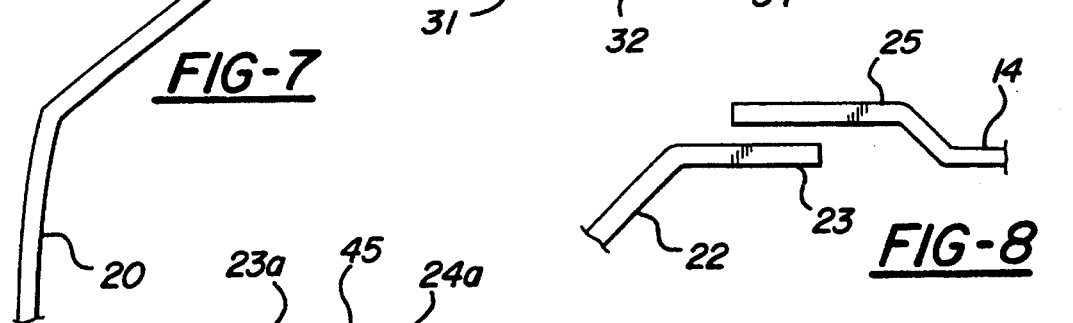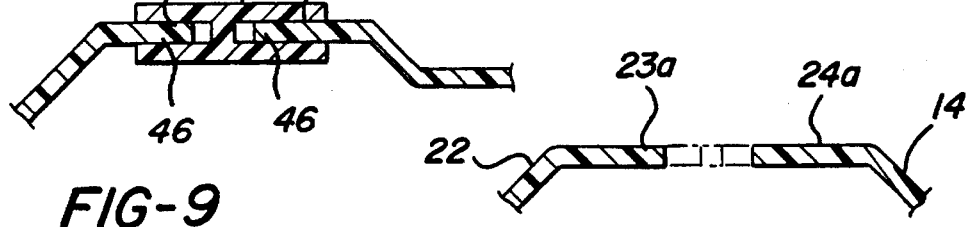

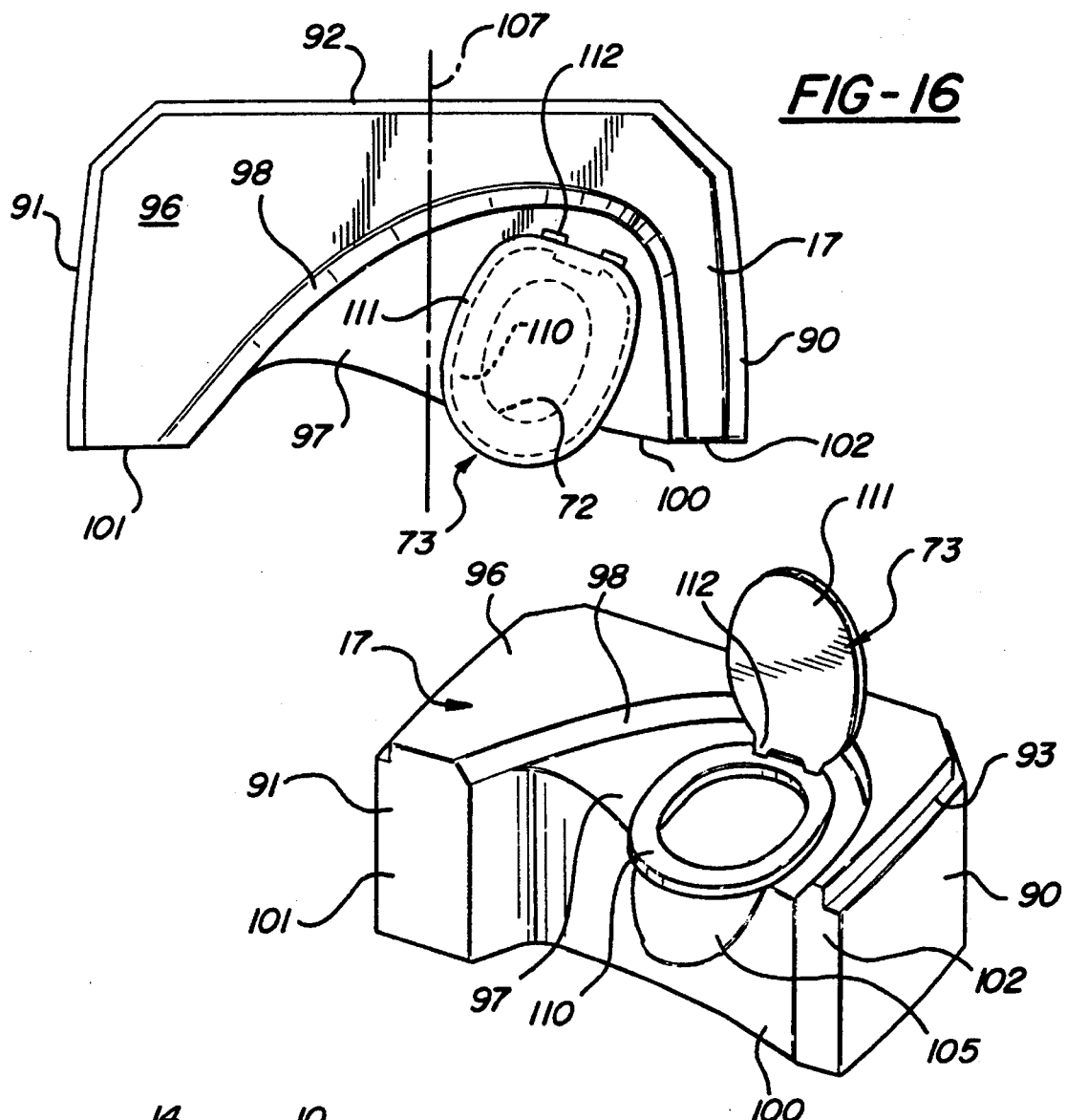
FIG-16
FIG-17
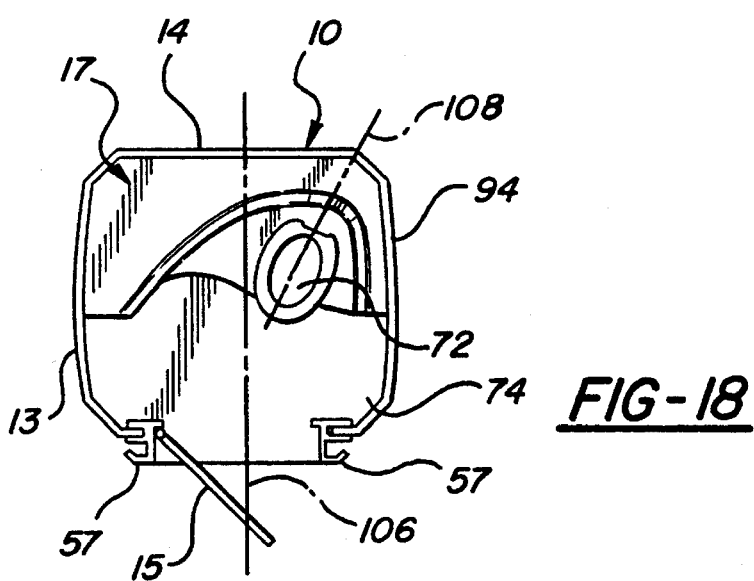
FIG-18

PORTABLE COMBINED TOILET AND WASTE HOLDING TANK

BACKGROUND OF INVENTION

This invention relates to a combined toilet and waste holding tank used for portable, outdoor-type toilets.

Conventional portable toilets comprise a cabana or housing within which a toilet and waste holding tank is mounted. Typically, cabanas are made of large sheets of plastic which are thermo-formed or otherwise bent and connected together to form rear and side walls, a front wall providing a doorway and door, a roof and floor. The cabana or housing forms an enclosure having a relatively small floor space.

Usually, a relatively large size waste material holding tank is positioned within the cabana and may occupy roughly one half of the floor space. Conventionally, the upper cover or panel of the tank, is provided with a toilet opening over which a toilet seat and cover is positioned. Commonly, a urinal construction is fastened to a wall, within the cabana, along side of the tank and, in some installations, a sink or wash bowl may also be provided.

Examples of such types of portable toilets, including their cabanas and toilet and waste tank constructions, are disclosed in U.S. Pat. No. 3,447,167, issued Jun. 3, 1969 to David B. Harding, for a Portable Toilet Cabana; U.S. Pat. No. 3,835,480, issued Sep. 17, 1974 to George W. Harding for a Chemical Toilet Cabana; U.S. Pat. No. 4,031,572, issued Jun. 28, 1977, to George W. Harding for a Chemical Toilet Cabana Shell Section; U.S. Pat. No. 4,577,351, issued Mar. 25, 1986, to George W. Harding for a Portable Toilet Cabana; U.S. Pat. No. 4,831,671, issued May 23, 1989 to George W. Harding for a Portable Toilet Cabana and U.S. Pat. No. 4,918,765, issued Apr. 24, 1990 to George W. Harding for a Portable Toilet Cabana.

Another example of a combined toilet and waste holding tank is disclosed in U.S. Pat. No. 3,435,464, issued on Apr. 1, 1969 to David B. Harding for a Portable Toilet. This patent discloses a tank having a cover upon which a toilet construction is formed so that the tank may be used as a toilet as well as a static waste collector. In this construction, as in comparable outdoor toilet constructions, the toilet waste material is removed from time to time by pumping the material, through a hose, from the tank into the collection tank of a waste removal truck.

While the types of combined toilets and tanks disclosed, for example, in the foregoing patents, are satisfactory, it would be desirable to make them more user-friendly for both men and women and to better utilize or make available more of the limited space commonly provided within a toilet cabana. Thus, this present invention relates to an improved combined toilet and waste-holding tank as will be further described below.

Further disclosures of a preferred embodiment of this invention are made in co-pending applications identified as U.S. Ser. No. 08/380,680, filed Jan. 30, 1995 (Attorney Docket No. 6823-00024) and U.S. Ser. No. 08/380,681, filed Jan. 30, 1995 (Attorney Docket No. 6823-00027) which disclosures are incorporated herein by reference.

SUMMARY OF INVENTION

This invention contemplates a combined toilet and waste material holding tank for use within outdoor, portable toilet cabanas or housings. The tank is shaped to fit between the cabana side walls and against the rear wall thereof so as to occupy roughly one-half of the floor space of the cabana. A ring-like shaped toilet construction is formed on the upper cover panel of the tank and opens into the tank. However, the toilet includes a forward, partial bowl-like portion which is molded or formed on the forward wall of the tank and extends forwardly. In addition, the toilet construction has a central axis which is acutely angled relative to the central, front to rear, axis of the cabana and tank. Thus, the toilet, which may be roughly oval in shape, is generally angled from a rear corner of the cabana towards the opposite, front corner. Further, the toilet construction is offset relative to the central axis of the cabana so that most, or all, of the toilet is arranged on one side of the axis of the cabana, where it is nearer to one of the side walls than to the opposite side wall.

Preferably, the front wall of the tank has a depressed center portion which is relatively flat and is arranged at an angle to the cabana central axis, but perpendicular to the central axis of the toilet construction. Thus, the bowl-shaped portion of the toilet, which extends forwardly of that wall section, has its forward-most point approximately equally spaced from the angled front wall section, on both sides of the toilet bowl portion.

With this toilet and tank construction, because of the forwardly extending bowl portion of the toilet, the toilet can provide a substitute for a urinal and is user friendly to both male and female users. In addition, the angularity of the toilet, that is, its axial angularity relative to the center line of the cabana, and its offset location relative to the center line, substantially increases the amount of space available to an occupant in using the toilet. In effect, the usable floor space is substantially increased without changing the dimensions of the cabana or its floor.

Further, it is contemplated to store and ship such combined toilet and waste material tanks separately from a cabana in order to reduce shipping costs, storage facility space and the like. Consequently, with this offset toilet arrangement, a pair of tanks can be nested together, front face to front face, with their respective toilet bowl portions nesting, side by side, on opposite sides of the tank central axes, within the depressed and angled front wall sections. Where desired, a second, similarly nested pair can be stacked upon the first pair and all of these tanks can be held together by suitable conventional strapping. Thus, the tanks can be shipped in groups of two or four. The nesting of the tanks tend to reinforce or protect them against damage due to impact incurred in the shipping. The tanks are constructed in such a manner as to be easily installed and removed from an assembled cabana when desired.

One object of this invention is to provide a combined toilet and waste material storage tank for use within portable toilet cabanas, which increases the usable floor space and which facilitates convenient unisex usage of the unit.

Another object of this invention is to provide a toilet and waste material storage tank construction which can eliminate the need for a separate urinal within an outdoor portable toilet cabana.

Still a further object of this invention is to provide a combined toilet and waste material storage tank construction which permits bundling or nesting of pairs of such tanks for storage and shipment separately from their cabanas so as to reduce the volume of space needed for shipping or storage purposes.

Yet another object of this invention is to provide an inexpensive, easily used and easily installed and serviceable toilet and waste tank unit which is easy to clean and which more efficiently utilizes the space within a typical portable toilet cabana.

DESCRIPTION OF DRAWINGS

FIG. 5 is an exploded or disassembled view of the major parts of the cabana.

FIG. 6 is an enlarged, partially fragmentary, view of a cross-section of the cabana showing the connections between the side and rear walls thereof.

FIG. 7 is an enlarged, cross-sectional view illustrating the rear wall and side wall connector strip with the adjacent wall sections positioned for insertion in the connector strip channels.

FIG. 8 is a schematic, enlarged view showing the overlapping relationship of the rear and side wall flanges.

FIG. 9 illustrates a modification of the connector strip in which the side and rear wall edge flanges are arranged edge to edge, rather than overlapped.

FIG. 10 is an enlarged, fragmentary view showing the aligned flanges of the modification of FIG. 9.

FIG. 16 is a top, plan view of the toilet and waste holding tank.

FIG. 17 is a perspective view of the toilet and tank with the toilet lid swung open.

FIG. 18 is a top, cross-sectional view, to a reduced scale, showing the combined toilet and tank positioned within a cabana.

DETAILED DESCRIPTION

Figure 1:
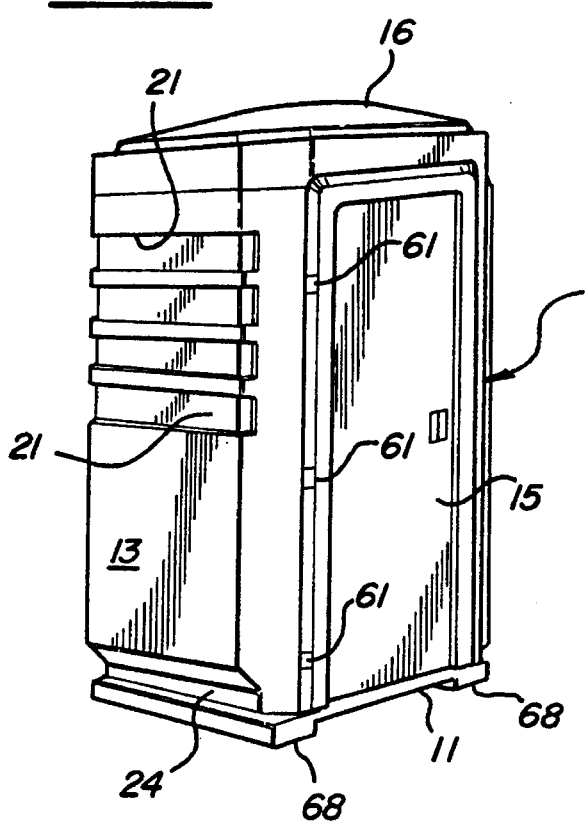
FIG. 1 is a perspective front and side view of the cabana.
Figure 2:
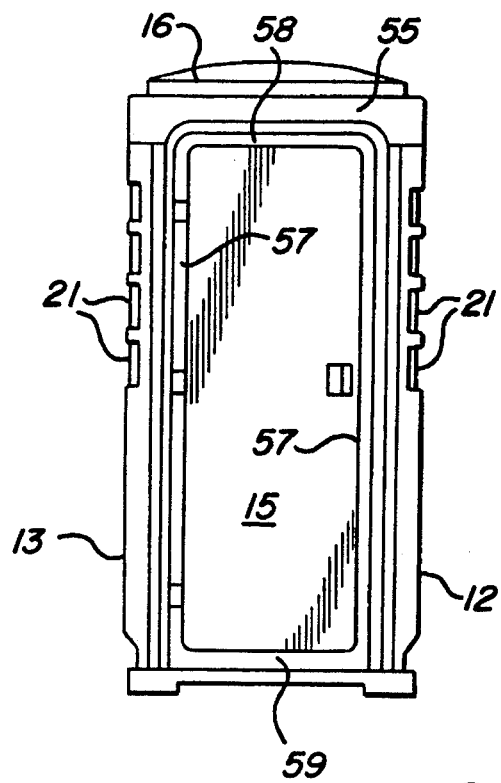
FIG. 2 is a front, elevational view of the cabana.
Figure 3:
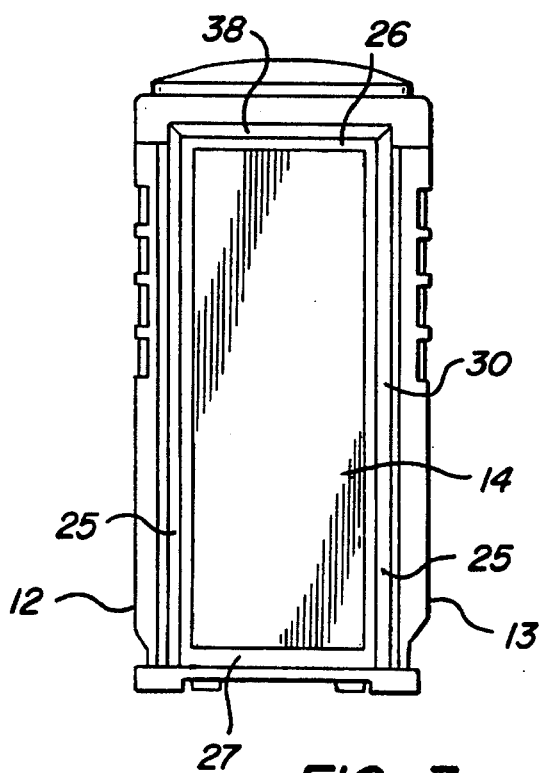
FIG. 3 is a rear, elevational view of the cabana.
Figure 4:
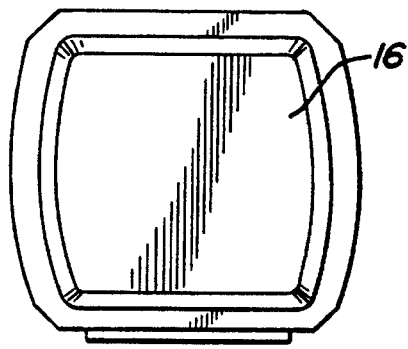
FIG. 4 is a top, plan view of the cabana.

As shown in the drawings, the cabana 10 includes a base or pallet 11, opposing side walls 12 and 13, a rear wall 14, a door 15 and a roof 16. A combined toilet and waste material tank 17 is positioned in the cabana. Each of these components will be separately described.

The side walls 12 and 13, preferably, are mirror images of each other. That is, they are made out of a single thermoformed plastic sheet element which is symmetrically formed. Therefore, they can be reversely arranged to form either a left or right side of the cabana. The side walls have a large panel face 20 which is substantially flat. Preferably, rather than forming the face truly planar, it is bowed outwardly a small amount. Also, the panel is formed with a series of indentations or channel-like depressions 21 which provide a decorative appearance as well as serve to rigidify the panels.

The opposite corners of each side wall are bent into corner sections 22. These sections may be angled, such as about 45°, to the panel face 20. The free edges of the corner sections are bent into vertical, side edge flanges 23. These side edge flanges are approximately perpendicular to the plane of the panel face 20 so that the corresponding side edge flanges 23 at the rear of both side panels extend toward each other in substantially the same plane. Likewise, the side edge flanges at the forward portion of the cabana, that is, where the door and doorway are located, also extend towards each other and are substantially in the same plane. The lower edges of the side walls 12 and 13 are each provided with a lower edge, horizontally extending flange 24.

The cabana rear wall 14 is provided with opposite side flanges or edge strip portions 25. Similarly, the upper edge of the rear wall 14 is formed with an upper flange or strip portion 26. A lower flange or strip portion 27 is formed on the lower edge of the rear wall.

The adjacent rear wall side flanges and side wall edge flanges are connected together by means of a connector strip 30. Preferably, the connector strip is formed of an extruded metal, such as aluminum, of sufficient strength and rigidity. The connector strip is formed in a squared S-shaped cross-section which provides an inner channel 31 whose inner wall is formed with a depressed, central, wall section 32. In addition, the connector strip has an outer channel 33. The two channels share a common wall 34. The outer wall 35 of the outer channel is provided with a pair of integral, rearwardly opening rear or bumper channels 36. Preferably, the free edges of the walls forming the bumper channels are provided with a hook-like configuration 37. The connector strips extend along the sides of the rear panel 14. In addition, connector strip portion 38 extends along the upper edge of the rear panel, as illustrated in FIG. 5.

In the preferred embodiment illustrated in FIG. 8, the side edge flange 23 and the rear wall side flange or strip 25 are arranged in substantially the same plane, but are actually offset slightly one from the other. Thus, the flange 25 overlaps the flange 23. As shown in FIG. 7, the flange 25 slips into the outer channel 33 of the connector strip 30. The side wall edge flange 23 slips into the inner channel 31 of the connector strip 30. The channels 31 and 33 are deeper than the anticipated lengths of the flanges 25 and 23 that fit within them. Thus, as illustrated in FIG. 6, the flanges 23 and 25 do not fill their respective channels but rather are spaced from the bottoms of these channels. Consequently, considerable room is allowed to accommodate for inaccuracies in the dimensions of the side walls and rear wall of the cabana. That is, the depth of entry of the flanges into the respective channel can be adjusted to obtain the desired overall width dimension of the cabana. Moreover, the free edges of the flanges need not be carefully trimmed or squared. This substantially reduces the amount of labor that might otherwise be required for that purpose. Once the flanges 23 and 25 are inserted and frictionally held within their respective channels 31 and 33, rivets 39 may be applied to fix the parts together. (See FIG. 6.)

Figure 11:
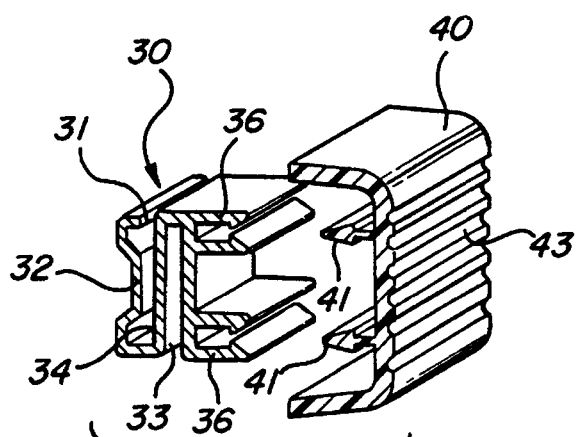
FIG. 11 is a fragmentary, cross-sectional and perspective view illustrating the wall connector strip with a bumper strip arranged in position for assembly thereto.

The connector strip is covered with a bumper strip 40. The bumper strip is made of a resilient plastic material, which is rubber-like in characteristics, and is generally U-shaped in cross-section. The bumper strip 40 is shown in assembled position, in FIGS. 6 and 12. FIG. 11 illustrates the bumper strip in position ready to be applied upon the connector strip.

The bumper strip 40 is held in place by integral prongs or tongues 41, that are arrow-head shaped, which fit into the bumper channels 36 on the connector strip 30. The arrow head prongs tend to interlock with the hooked ends 37 of the bumper channels to prevent removal of the bumper strip once they are inserted. The bumper strip is arranged to extend around and to cover the exposed portions of the connector strip. Thus, one of its purposes is to enhance the appearance of the rear of the cabana. Another purpose is to provide a resilient bumper to protect the cabana against damage due to impacts which occur during the transportation of the cabana to and from its sites of use. Normally, these cabanas are transported from one site to another, upon trucks. When a number of cabanas are carried upon a truck, there is a tendency for them to strike each other during the jolting of the truck. Thus, the bumper strips prevent damage.

The bumper strips 40 may include grooves 43 or indentation stripes. These grooves or stripes enhance the appearance of the bumper strips and also, may increase the resilient movement of the portions of the bumper strips that sustain impacts.

Figure 12:
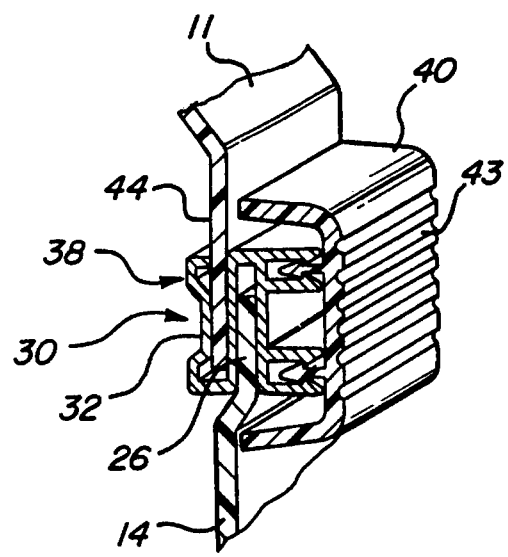
FIG. 12 is a fragmentary, cross-sectional view showing the assembly of the connector strip, the roof and rear wall flanges and the bumper strip.

As illustrated in FIG. 12, the cover or roof 16 of the cabana is provided with a rear, downwardly extended, flange 44. This flange fits into the inner channel 31 of the horizontal upper portion 38 of the connector strip. The upper flange 26 of the rear panel fits into the outer channel 33 of the horizontal part 38 of the connector strip (see FIG. 12).

FIGS. 9 and 10 illustrate a modified form of connector strip. This strip 45 is generally H-shaped in cross-section and is made of a suitable metal extrusion, such as aluminum, of sufficient strength for the purpose. Here, the strip is provided with opposed channels 45 into which the aligned flanges 23a and 24a of the respective side and rear walls are inserted.

FIG. 10 shows the flanges arranged in a common plane rather than being slightly offset from the same plane as illustrated in FIGS. 7 and 8. As illustrated in the drawings, the channels 46 are deeper than the portions of the flanges inserted into them so as to allow for variations in dimensions of the wall portions. Suitable rivets (not shown) may be used to fix the flanges within the channels.

Figure 13:
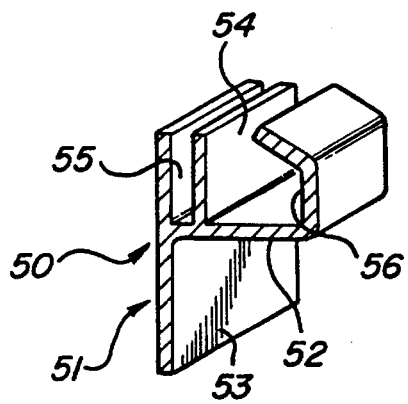
FIG. 13 is an enlarged, fragmentary, perspective view of the doorway strip.
Figure 14:
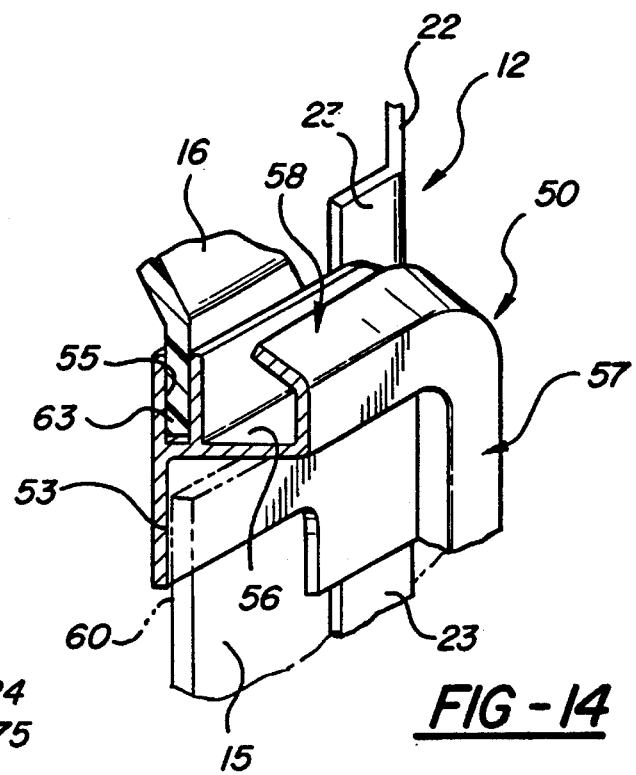
FIG. 14 is an enlarged, fragmentary, perspective view of a corner of the doorway defining strip illustrating a segment of the cover flange and side wall flange connected thereto and, in dotted lines, a door fitted therein.

Turning to the front of the cabana, the space between the opposed side wall flanges provides a doorway. The doorway is defined or outlined by a doorway strip 50. This strip is preferably formed of a metal extrusion, such as aluminum, which, as shown in FIG. 13, is T-shaped in cross-section to provide a head 51 and a stem 52. One side of the head provides a door stop flange 53. The other side of the head, along with an integral second flange 54, forms a channel 55. This channel receives the side wall forward flanges 23 (see FIG. 14). In addition, the stem part of the extruded strip is bent into a J-shaped cross-section to provide a water drain channel 56.

The doorway-defining strip is arranged to provide jamb portions 57 and a header portion 58 along the sides and top of the doorway. In addition, a sill strip 59 is fastened to the lower ends of the jamb portions 57. The sill strip may be of the same cross-section as the doorway strip or may simply be a metal strip which is flat or is angled, in cross-section. Thus, the strip 50 provides a doorway outline or frame.

The door 15, may be provided with an edge flange portion 60. A suitable gasket or padding strip (not shown) may be arranged around the edges of the door. Also, the door may be formed of a pair of overlapped panels, joined together at their edges to provide a rigid door panel (not shown). The door is provided with hinges 61 for connecting it to one of the jamb forming members 57. In addition, a latch mechanism 62 (shown schematically) may be mounted upon the door for closing and locking the door when the cabana is in use.

The roof 16 is provided with a front edge flange 63 which is fitted within the channel 55 of the header portion 58 of the doorway defining strip 50. (See FIG. 14.) Rivets or the like may be used to secure the parts together.

The cabana base 11, preferably, is in the form of a pallet frame 65. The pallet frame may be molded of a suitable, strong, durable, plastic material and is hollow (see, for example, FIG. 15). As illustrated in FIG. 5, the base or pallet frame is preferably formed with a rear socket forming opening 66 and forward supports or struts 67. Integral skids or skid portions 68 are formed on the sides and lower surface of the base or pallet. These skids may have their lower surfaces provided with a series of beads or ribs 69 and 69a (see FIG. 15). Between the beads 69a, a plastic skid strip insert 70 may be positioned and fastened in place with suitable screws (not shown) so that the cabana unit may be slid upon the ground or upon a support surface. Thus, wear on the bottoms of the pallets of such cabanas is taken by the inserts and, in the event of undue wear or damage, the worn inserts 70 may be removed and replaced with new inserts.

The cabana is primarily designed as a housing for an outdoor toilet. Thus, as shown in FIG. 5, a static waste-receiving toilet tank 17 is arranged upon the base or pallet 11 over the rear open socket portion. The lower portion of the tank may be extended downwardly (not shown) to form a flat, pan-like portion 71 that fits within the open socket portion 66 to thereby stabilize the tank in position. A toilet opening 72 is provided on the upper surface of the toilet tank. A toilet seat and cover unit 73 is positioned over the toilet opening.

The forward portion of the pallet is covered with a rigid floor panel 74 which may be formed of plywood or sheet plastic or the like to provide a floor upon which an occupant may stand.

Figure 15:
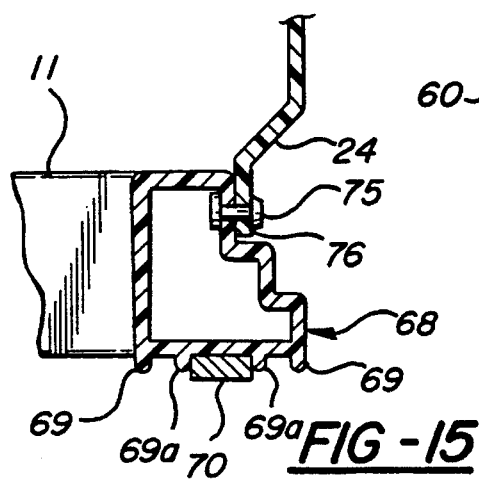
FIG. 15 is a cross-sectional view of a fragment of the base or pallet of the cabana with the lower edge of a side wall panel connected thereto.

The lower edge flanges 24 of the side walls of the cabana are fastened, such as by rivets 75 or screws or the like, to the sides, along side notches 76 formed on the base frame (see FIG. 15). The upper edges of the side walls are cut out to form depressions or elongated slots 80 which may provide ventilation openings beneath the sides of the overlapping roof. The roof may be formed with integral box-like side edge sections 81 which overlap enlargements 82 formed on the upper edges of the side walls. The roof edge sections may be fastened to the enlargements by suitable rivets or the like (not shown).

In addition, the cabana may include a sink unit 85 of suitable design. This includes a sink or washing bowl 86 which may be mounted upon a support that can be used as a water tank 87 (see FIG. 5). A suitable water pump, such as a manually operated pump, can be installed for pumping water to the sink from the water tank. Alternative arrangements of the toilet and the sink units within the cabana may be used. Thus, the drawings and the disclosure herein illustrate one embodiment of this arrangement.

Figure 19:
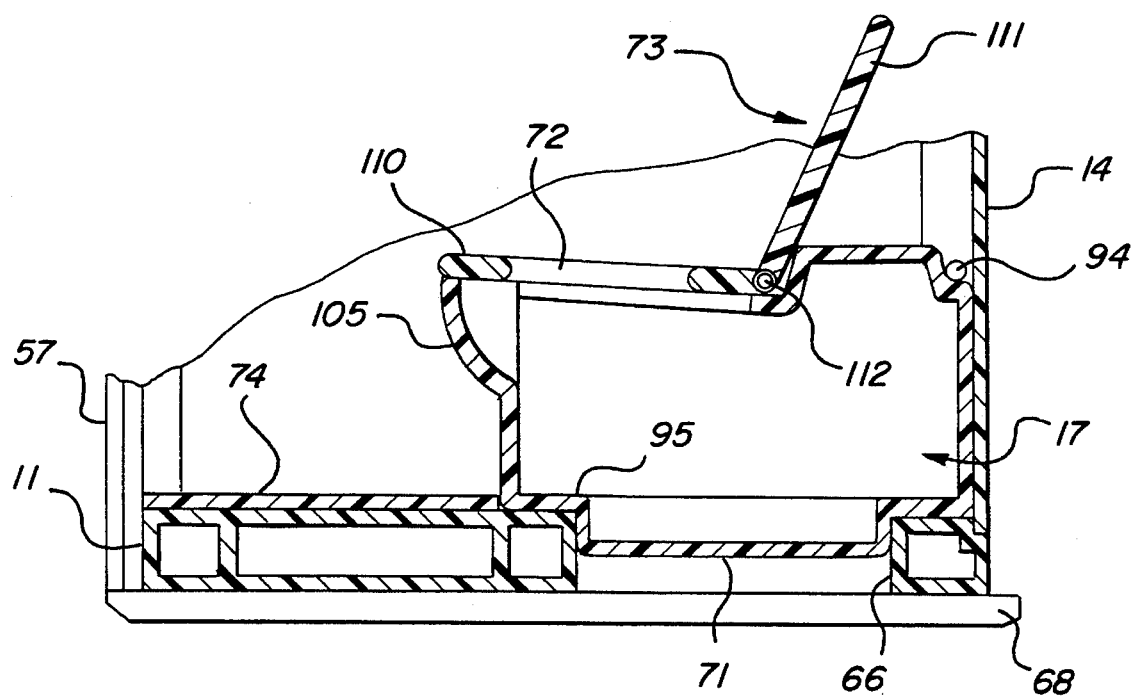
FIG. 19 is an enlarged, cross-sectional view of the toilet and tank fitted within a cabana base, with the lower portion of the cabana shown in cross-section.

The combined toilet and waste material tank 17, in more detail, is formed with opposed side walls 90 and 91 and a rear wall 92. The side walls are preferably bowed or curved somewhat to closely match the interior surfaces of the cabana walls 12 and 13. In addition, the upper edges of the side and rear walls of the tank are formed with a notch 93 which receives a rubber-like gasket strip 94. The gasket seals the tank to the adjacent areas of the cabana walls (see FIGS. 18 and 19).

The bottom panel 95 of the tank (see FIG. 19) is formed with the depressed, shallow, flat pan-like portion 71, mentioned previously. Thus, the area of the bottom which surrounds the pan-like depression, provides a ledge which rests upon the upper surface of the portions of the base which define the open socket 66 of the base. This is shown schematically in FIG. 19.

The tank is closed with an upper, closure panel 96 which has a depressed portion 97 integrally connected to the main body of the upper panel by an integral flange-like strip 98. In addition, the tank has a front wall 99 having a middle portion 100 which is angled relative to opposite side portions 101 and 102 of the front wall 99.

The toilet 72 has a forward, partial bowl-like portion 105 which extends forwardly of the middle portion 100 of the front wall.

Figure 20:
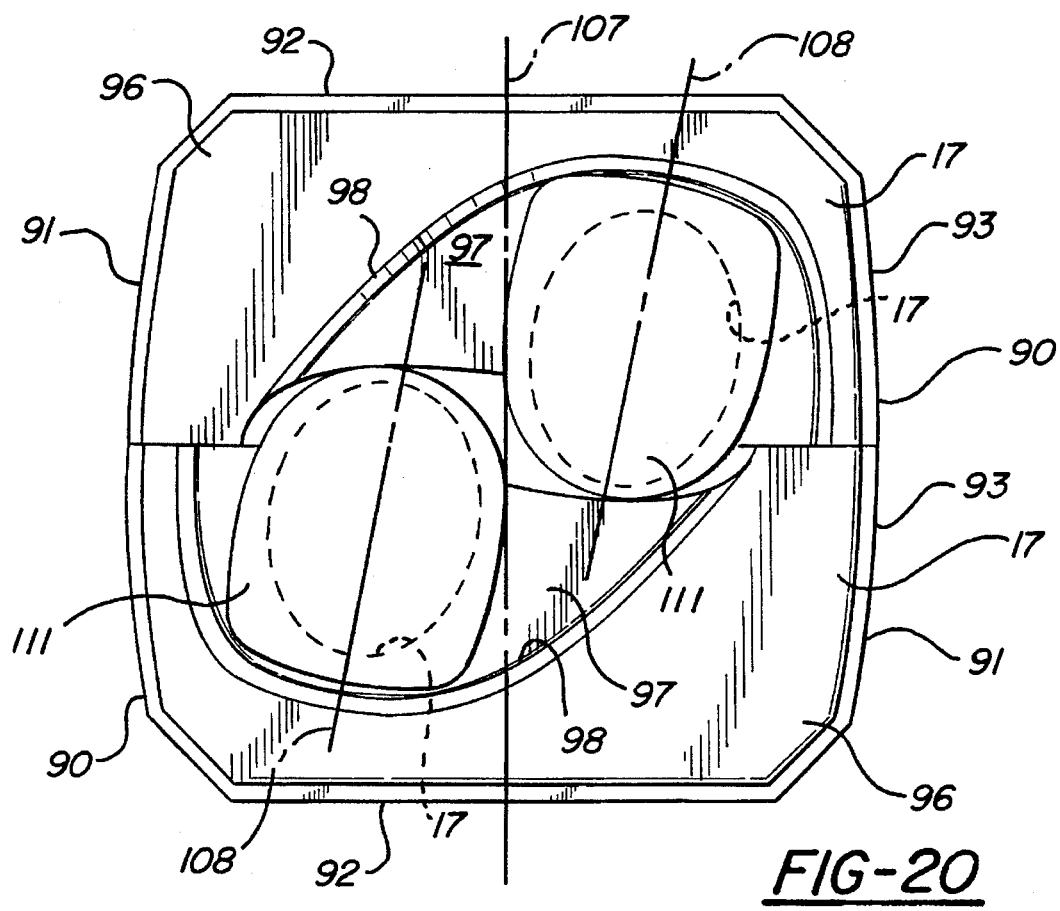
FIG. 20 is a top, plan view showing a pair of toilet and tank units nested together, face to face, for storage or shipping.

As shown in FIGS. 18 and 20, the cabana has a front to rear central axis 106 which bisects the cabana into two opposite sides. Similarly, the tank has a corresponding central axis 107 which is in alignment with the cabana axis 106.

The toilet, however, has a central axis 108 (see FIG. 18) which is angled to intersect the central cabana and tank axes 106 and 107 at an acute angle. The middle section 100 of the front wall is approximately perpendicular to the axis 108 of the toilet so that it is angled relative to the axes 106 and 107.

Thus, the forward-most portion of the bowl-like portion of the toilet is roughly in the plane of the side portions 101 and 102 of the front wall 99 of the tank. The distances from the forward-most point of the bowl-like portion of the toilet to the surface of the middle wall section 100, are approximately equal on both sides of the toilet.

The toilet seat-cover unit 73 may be formed of a conventional toilet seat 110 and a suitable, correspondingly shaped and sized cover or lid 111. The cover and lid are connected together and to the tank by conventional hinges 112. Thus, for use, the toilet lid 111 may be swung upwardly, as illustrated in FIG. 17, to expose the seat 110. The partial bowl-like extension of the toilet, extending forwardly and spaced on either of its sides approximately equidistantly from the front wall section with which it is joined, makes the toilet more user friendly for both males and females. This arrangement makes it possible to eliminate a separate urinal which would otherwise be conventionally mounted within the cabana. Hence, the toilet arrangement is intended to be unisex and is convenient and comfortable for use by either gender.

The tank may be periodically cleaned by inserting the end of a pipe through the toilet opening into the tank and connecting the opposite end of the pipe to a waste removal truck for pumping out the contents of the tank. This is a conventional system for cleaning toilets of this type.

Figure 21:
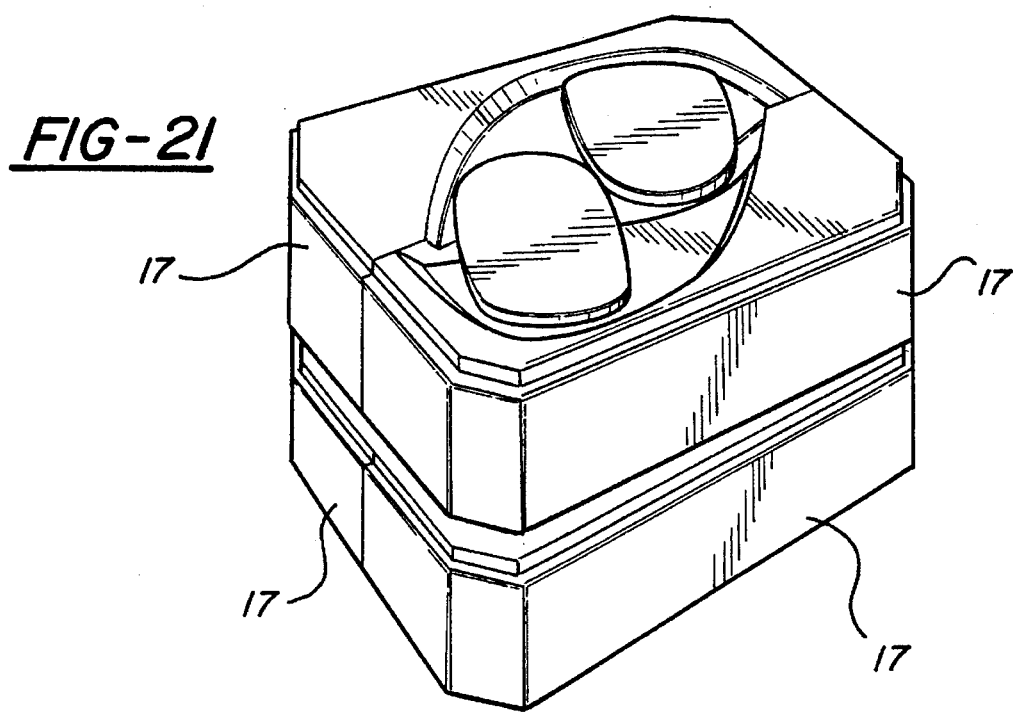
FIG. 21 is a perspective view of two pairs of toilet and tank units stacked upon each other for storage or shipping.

When the cabana, whether fully assembled or in a disassembled or knock-down form, is to be transported from one site to another or is to be stored, the waste tank may be removed and bundled together with other waste tanks as shown in FIGS. 20 and 21. With the toilet offset to one side of the central axis of the tank and the angled arrangements of the toilet and the middle portion of the front wall, a pair of tanks may be positioned in front face to front face arrangement. The forward extending partial bowl-like portions of each of the toilets nest within the deepest portions of the angled opposing front wall middle section. Hence, the two tanks reduce the space required for storage or shipping and, tend to strengthen each other against impacts. For this purpose, conventional shipping straps (not shown) may be wrapped around the tanks to hold them together.

Two separate pairs of tanks may be shipped together as a single unit by stacking one pair upon the other, as illustrated in FIG. 21. Thus, the lower surface of the pan-like lower extension 71 of each of the upper pairs of tanks rest upon the upper surface of the pair of tanks beneath them. All of the tanks may then be secured together with conventional wrapping straps.

As can be seen, the components forming the cabana are relatively simple in construction and the system for securing the components together is able to accommodate relatively wide discrepancies in dimensions or finishings of the edges of the wall and door components while still providing a strong, rigid and attractive cabana unit. Moreover, the components are so formed and so fastened together that they may be individually replaced in the event any one or more of the components are damaged during the transportation or use of the unit. Further, the toilet and tank units can be easily transported and replaced when necessary.

This invention may be further developed within the scope of the following claims.

Thus, having fully described at least one operative embodiment of this invention, it is now claimed:

1. In a portable toilet cabana for forming an enclosure for a combined toilet and waste holding tank, with the cabana having a base, side walls, a rear wall and a front wall with a doorway and door, and with the tank having side walls and a rear wall normally positioned adjacent the interior surfaces of the respective cabana side and rear walls and an upper cover panel, the tank having a front wall spanning the space between the cabana side walls, so that the tank occupies roughly the rear one-half of the cabana floor space, and with a ring-like toilet structure formed on the upper cover panel of the tank and opening into the tank, the improvement comprising:

the toilet structure including a forward, partial bowl-like portion formed on a section of the front wall of the tank and extending forwardly of the front wall section upon which it is formed, and with the toilet structure having a central axis which is arranged at an acute angle, measured from front to rear of the cabana, relative to the front to rear central axis of the cabana;

and with the toilet construction being substantially located between the central axis of the cabana and one side wall of the tank;

and wherein the front wall section upon which the forward bowl-like portion of the toilet is formed is arranged at an acute angle relative to the central axis of the cabana and in a plane which is approximately perpendicular to the central axis of the toilet structure;

and said section is depressed relative to the overall plane of the front wall of the tank so that the forward-most part of the front bowl-like portion of the toilet is approximately equally spaced, on both of its sides, from the front wall section upon which it is formed to provide approximately equal floor space distances on both sides of the toilet bowl-like portion to the front wall section;

whereby the toilet is angled in a general direction from a rear corner formed by the rear and side wall of the cabana towards the opposite front corner formed by the opposite side wall and front wall of the cabana to provide increased occupant-usable floor space within the cabana enclosure.

2. A construction as defined in claim 1, and wherein the cover panel of the tank has a depressed portion on opposite sides and the rear of the ring-like toilet structure, which is integrally connected with the main portion of the tank upper cover panel.

3. A construction as defined in claim 2, and said tank forward wall angled section being sufficiently deep between the tank central axis and its corresponding tank side wall so as to receive, in nested relationship, the toilet bowl-like portion of a second, substantially identical combined toilet and waste-holding tank, when the two tanks are horizontally aligned and with their respective toilet bowl-like portions arranged adjacent each other and nested within the depressed portion of the front wall of the opposite tank;

whereby the tanks may be stored and shipped in nested pairs when desired and inserted within and removed from their respective cabanas when desired.

4. A construction as defined in claim 3, and including each tank having a downwardly extending, pan-like shaped flat depression formed in its lower, bottom wall, and surrounded by a rim formed by the remaining portions of the bottom wall; with the pan-like shaped depression being formed for fitting within a socket-like opening provided in the base of the cabana for immovably holding the tank within the cabana upon the cabana base.

5. A combined toilet and waste holding tank for use within a portable toilet cabana of the type having a base, opposite side walls, a rear wall and a front wall including a doorway and door, and a roof all connected together to form a room-like enclosure for a toilet, comprising:

a waste holding tank having side walls and a rear wall for normally being arranged adjacent corresponding interior surfaces of the respective cabana side and rear walls;

and the tank having a bottom panel for being supported upon the cabana base, and an upper horizontally arranged cover panel, and a front wall extending between the tank side walls and between the tank cover panel and bottom panel;

the tank having a central axis, extending from its rear to its front walls, which substantially corresponds to the central axis of the cabana that is located approximately equidistant from the side walls of the cabana and extends from the cabana rear wall to its front wall;

a toilet construction formed on the tank cover panel and front wall and opening into the tank, with the toilet construction having an upper, ring-like shaped portion which has a central, front-to-rear axis that is angled at an acute angle relative to the tank central axis and is offset to one side of the tank central axis so that the toilet construction is substantially located between the tank central axis and one of the side walls of the tank;

and said toilet ring-like shaped upper portion having a forward, bowl-like portion extending downwardly, integral with the tank front wall, and extending forwardly of the tank front wall, that is, arranged to extend towards the cabana front wall at an angle, and said toilet ring-like shaped portion having a rear portion arranged on the tank cover panel;

and with the tank front wall having an integral, substantially flat, central section which is depressed rearwardly towards the rear wall of the tank and which extends on both sides of the toilet forward bowl-like portion;

whereby when the tank is mounted within a cabana, the toilet is generally arranged close to one side wall of the cabana and at an angle relative to the cabana central axis to thereby provide for increased occupant useful floor space between the tank and the front and opposite side walls of the cabana.

6. A combined toilet and waste holding tank as defined in claim 5, and with said front wall depressed section of the tank being depressed, relative to the plane of the remainder of said front wall, roughly as deeply as the distance that the toilet forward bowl-like portion extends to the plane of the remaining portion of the front wall so that the forward-most part of the toilet forward bowl-like portion is roughly in the plane of the remainder of said front wall portion, which remainder is arranged at opposite sides of the depressed central section at the respective opposite side walls of the tank.

7. A combined toilet and waste holding tank as defined in claim 6, and including a second, substantially identical combined toilet and waste holding tank, with the two tanks being nestable together for storage and shipping, with their remainder portions of their front walls arranged adjacent, in face to face arrangement, to each other, and their toilet forward bowl-like portions arranged on opposite sides of their aligned central axes, with each of said toilet forward bowl-like portions fitted within the front wall depressed section of the opposite tank.

8. A combined toilet and waste holding tank as defined in claim 7, and including the depressed sections of the two tank front walls, each being angled so as to be arranged approximately perpendicular to the central axis of its respective toilet construction and being angled relative to the tank central axis, so that the toilet bowl-like portion of one tank may be arranged within the depressed front wall section of the opposite tank between the central axis of the tank and the side wall of the tank opposite to the side wall which is nearer to the toilet construction.

9. A combined toilet and waste holding tank as defined in claim 8, and including the tank upper cover panel having a substantially flat, depressed panel section surrounding the toilet construction formed thereon, and with the depressed section having side and rear edges that are integrally joined to the remainder of the cover panel by an approximately vertically upstanding continuous flange.

10. A combined toilet and waste holding tank for use within a portable toilet cabana of the type having a base, opposite side walls, a rear wall and a front wall including a doorway and door, and a roof all connected together to form a room-like enclosure for a toilet, comprising:

a waste holding tank having side walls and a rear wall for normally being arranged adjacent corresponding interior surfaces of the respective cabana side and rear walls;

and the tank having a bottom panel for being supported upon the cabana base, and an upper horizontally arranged cover panel, and a front wall extending between the tank side walls and between the tank cover panel and bottom panel;

the tank having a central axis, extending from its rear to its front walls, which substantially corresponds to the central axis of the cabana that is located approximately equidistant from the side walls of the cabana and extends from the cabana rear wall to its front wall;

a toilet construction formed on the tank cover panel and front wall and opening into the tank, with the toilet construction having an upper, ring-like shaped portion which has a central, front-to-rear axis that is angled at an acute angle relative to the tank central axis and is offset to one side of the tank central axis so that the toilet construction is substantially located between the tank central axis and one of the side walls of the tank;

and said toilet ring-like shaped upper portion having a forward, bowl-like portion extending downwardly, integral with the tank front wall, and extending forwardly of the tank front wall, that is, arranged to extend towards the cabana front wall at an angle; and said toilet ring-like shaped portion having a rear portion arranged on the tank cover panel;

and with the tank upper cover panel having a substantially flat, depressed panel section surrounding the toilet ring-like construction and with the depressed section having side and rear edges that are integrally joined to the remainder of a cover panel by a vertically extending, continuous flange;

and the depressed panel section having a front edge which is integral with the upper edge portion of the tank front wall so that the toilet upper ring-like portion that is on the upper cover panel is raised slightly above the upper surface of the cover panel depressed section;

whereby when the tank is mounted within a cabana, the toilet is generally arranged close to one side wall of the cabana and at an angle relative to the cabana central axis to thereby provide for increased occupant useful floor space between the tank and the front and opposite side walls of the cabana.

11. A combined toilet and waste holding tank for use within a portable toilet cabana of the type having a base, opposite side walls, a rear wall and a front wall including a doorway and door, and a roof all connected together to form a room-like enclosure for a toilet, comprising:

a waste holding tank having side walls and a rear wall for normally being arranged adjacent corresponding interior surfaces of the respective cabana side and rear walls;

and the tank having a bottom panel for being supported upon the cabana base, and an upper horizontally arranged cover panel, and a front wall extending between the tank side walls and between the tank cover panel and bottom panel;

the tank having a central axis, extending from its rear to its front walls, which substantially corresponds to the central axis of the cabana that is located approximately equidistant from the side walls of the cabana and extends from the cabana rear wall to its front wall;

a toilet construction formed on the tank cover panel and front wall and opening into the tank, with the toilet construction having an upper, ring-like shaped portion which has a central, front-to-rear axis that is angled at an acute angle relative to the tank central axis and is offset to one side of the tank central axis so that the toilet construction is substantially located between the tank central axis and one of the side walls of the tank;

and said toilet ring-like shaped upper portion having a forward, bowl-like portion extending downwardly, integral with the tank front wall, and extending forwardly of the tank front wall, that is, arranged to extend towards the cabana front wall at an angle; and said toilet ring-like shaped portion having a rear portion arranged on the tank cover panel;

and with the tank front wall being arranged approximately perpendicular to the central axis of the toilet construction, and being angled relative to the tank central axis to provide approximately equal floor space distances between the front-most part of the toilet forward portion and the tank front wall;

whereby when the tank is mounted within a cabana, the toilet is generally arranged close to one side wall of the cabana and at an angle relative to the cabana central axis to thereby provide for increased occupant useful floor space between the tank and the front and opposite side walls of the cabana.

* * * * *